United States Patent
Al-Nakhli et al.

(10) Patent No.: US 10,030,492 B2
(45) Date of Patent: Jul. 24, 2018

(54) WELL TESTING THROUGH A GENERATED EXOTHERMIC REACTION IN THE WELLBORE

(71) Applicant: Saudi Arabian Oil Company, Dhahran (SA)

(72) Inventors: Ayman Raja Al-Nakhli, Dammam (SA); Hazim Hussein Abass, Dhahran (SA); Mirajuddin Riazuddin Khan, Al-Khobar North (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/177,002

(22) Filed: Jun. 8, 2016

(65) Prior Publication Data
US 2016/0376884 A1    Dec. 29, 2016

Related U.S. Application Data (60) Provisional application No. 62/184,415, filed on Jun. 25, 2015.

(51) Int. Cl.
| | | |
|---|---|---|
| *E21B 47/06* | (2012.01) | |
| *E21B 43/24* | (2006.01) | |
| *C09K 8/62* | (2006.01) | |
| *E21B 49/00* | (2006.01) | |
| *E21B 49/08* | (2006.01) | |
| *E21B 33/12* | (2006.01) | |

(52) U.S. Cl.
CPC ............ *E21B 43/2405* (2013.01); *C09K 8/62* (2013.01); *E21B 47/06* (2013.01); *E21B 49/00* (2013.01); *E21B 49/08* (2013.01); *E21B 33/12* (2013.01)

(58) Field of Classification Search
CPC .......... E21B 43/26; E21B 43/16; E21B 47/06; E21B 49/08; E21B 33/12; E21B 43/2405; C09K 8/62
USPC ........................................................ 166/300
See application file for complete search history.

(56) References Cited

U.S. PATENT DOCUMENTS

| | | | |
|---|---|---|---|
| 3,712,380 A | 1/1973 | Caffey | |
| 4,683,068 A * | 7/1987 | Kucera ................... | C08B 11/20 166/283 |
| 4,846,277 A * | 7/1989 | Khalil ..................... | C09K 8/703 166/280.1 |

(Continued)

FOREIGN PATENT DOCUMENTS

| | | |
|---|---|---|
| EP | 1936112 B1 | 12/2009 |
| EP | 1693547 B1 | 4/2010 |

(Continued)

OTHER PUBLICATIONS

International Search Report and Written Opinion issued in International Application No. PCT/US2016/036410 dated Sep. 20, 2016.

(Continued)

*Primary Examiner* — Silvana C Runyan
(74) *Attorney, Agent, or Firm* — Fish & Richardson P.C.

(57) ABSTRACT

Techniques for well testing include providing an amount of a chemical material to a location in a wellbore; reacting the chemical material to generate an exothermic chemical reaction at the location in the wellbore; and fracturing the formation by the exothermic chemical reaction.

30 Claims, 6 Drawing Sheets

(56) References Cited

U.S. PATENT DOCUMENTS

| | | | |
|---|---|---|---|
| 2004/0014607 A1* | 1/2004 | Sinclair | C09K 8/516 |
| | | | 507/200 |
| 2013/0126169 A1 | 5/2013 | Al-Nakhli et al. | |
| 2013/0180720 A1 | 7/2013 | Al-Dahlan et al. | |
| 2014/0262249 A1* | 9/2014 | Willberg | E21B 43/247 |
| | | | 166/251.1 |
| 2014/0374108 A1 | 12/2014 | Vandeponseele et al. | |
| 2015/0300142 A1* | 10/2015 | Al-Nakhli | C09K 8/90 |
| | | | 166/280.1 |

FOREIGN PATENT DOCUMENTS

| | | |
|---|---|---|
| WO | WO2002029196 A3 | 4/2002 |
| WO | 2010043239 | 4/2010 |
| WO | WO2012101727 A3 | 8/2012 |
| WO | 2014149524 | 9/2014 |

OTHER PUBLICATIONS

S.Y. Zheng, P. Corbett, "Well Testing Best Practice," Jun. 13, 2005, 67th EAGE Conference & Exhibition; Session: Recovery Optimisation and IOR (EAGE/EUROPEC Session), SPE 93984

* cited by examiner

WELL TESTING THROUGH A GENERATED EXOTHERMIC REACTION IN THE WELLBORE

CROSS-REFERENCE TO RELATED APPLICATION

This application claims priority under 35 U.S.C. § 119 to U.S. Provisional Patent Application Ser. No. 62/184,415, entitled "Well Testing," and filed Jun. 25, 2015, the entire contents of which are incorporated by reference herein.

TECHNICAL FIELD

This disclosure relates to methods and systems for testing a well.

BACKGROUND

Well testing is a tool for the exploration and planning of hydrocarbon field development. Well testing can provide a wide range of reservoir information, such as well productivity, permeability, pressure, formation damage, and drainage area. Furthermore, the sampling of reservoir fluids during well testing can provide information that is used for designing well and surface facilities associated with reservoir development. Drawdown and build-up well testing are common in conventional reservoirs to obtain this information. Drawdown and build-up testing includes drilling a wellbore and shutting in the well for a period of time to allow the wellbore pressure to build. After a sufficient pressure is built up, hydrocarbon fluid may be produced for testing purposes. Surface parameters, such as well head pressure and temperature, separator conditions, sand presence, and preliminary characterization of fluids (for example, oil gravity, gas gravity, and water salinity) can be measured. Downhole pressure and temperature can be measured using a downhole pressure and temperature gauges during both drawdown and build-up phases.

SUMMARY

This disclosure describes implementations of methods and systems for well testing by generating a downhole chemical reaction. In some implementations, a chemical or chemicals, or a mixture of two or more chemicals, is provided to a particular location in a wellbore. The particular location in the wellbore, which may be open or cased, is adjacent a hydrocarbon bearing formation. In some aspects, the hydrocarbon bearing formation is an unconventional reservoir in that the formation does not exhibit hydrocarbon flow without completion operations (for example, secondary or tertiary) being completed. In some aspects, the chemical or chemical mixture reacts at the particular location to generate an exothermic chemical reaction that releases heat and a pressurized fluid (for example, a pressurized gas). The pressurized fluid generates a pressure pulse that forms fractures in the formation. Hydrocarbon fluid can then flow through the fractures into the wellbore for analysis.

In an example general implementation, a well testing method includes providing an amount of a chemical material to a location in a wellbore; reacting the chemical material to generate an exothermic chemical reaction at the location in the wellbore; and fracturing the formation by the exothermic chemical reaction.

A first aspect combinable with the general implementation further includes generating a pressure pulse, by the exothermic chemical reaction, to fracture the formation.

In a second aspect combinable with any of the previous aspects, the chemical material includes an ammonium material and a nitrite material.

In a third aspect combinable with any of the previous aspects, the ammonium material includes at least one of ammonium chloride, ammonium bromide, ammonium nitrate, ammonium sulfate, ammonium carbonate, or ammonium hydroxide.

In a fourth aspect combinable with any of the previous aspects, the nitrite material includes at least one of sodium nitrite, potassium nitrite, or sodium hypochlorite.

In a fifth aspect combinable with any of the previous aspects, the chemical material includes a combination of urea and sodium hypochlorite, urea and sodium nitrite, ammonium hydroxide and sodium hypochlorite, or ammonium chloride and sodium nitrite.

A sixth aspect combinable with any of the previous aspects further includes producing a hydrocarbon fluid from the formation to the wellbore; and determining at least one well parameter based on the produced hydrocarbon fluid.

In a seventh aspect combinable with any of the previous aspects, the well parameter includes at least one of well head pressure, well head temperature, sand presence, oil gravity, gas gravity, or water salinity.

In an eighth aspect combinable with any of the previous aspects, the pressure pulse includes a pressure magnitude that is greater than a breakdown pressure of the formation.

A ninth aspect combinable with any of the previous aspects further includes determining at least one of a volume percentage of the chemical material or a concentration of the chemical material based on the breakdown pressure of the formation.

A tenth aspect combinable with any of the previous aspects further includes cooling the location in the wellbore prior to providing the amount of the chemical material to the location in the wellbore.

In an eleventh aspect combinable with any of the previous aspects, the location in the wellbore includes circulating a cooling fluid into the wellbore, the cooling fluid having a temperature less than an initiation temperature of the exothermic chemical reaction.

In a twelfth aspect combinable with any of the previous aspects, the cooling fluid includes brine.

A thirteenth aspect combinable with any of the previous aspects further includes circulating the cooling fluid into the wellbore until a temperature at the location in the wellbore is less than a specified temperature at the location.

In a fourteenth aspect combinable with any of the previous aspects, reacting the chemical material to generate the exothermic chemical reaction at the location in the wellbore includes reacting the chemical material to generate the exothermic chemical reaction at the location in the wellbore when a temperature at the location raises to the initiation temperature of the exothermic chemical reaction.

In a fifteenth aspect combinable with any of the previous aspects, the chemical material includes a reducer and an oxidizer.

In a sixteenth aspect combinable with any of the previous aspects, reacting the chemical material to generate an exothermic chemical reaction at the location in the wellbore includes reacting the reducer and the oxidizer with heat to generate the exothermic chemical reaction.

A seventeenth aspect combinable with any of the previous aspects further includes mixing the reducer and the oxidizer together in the wellbore.

In an eighteenth aspect combinable with any of the previous aspects, the exothermic chemical reaction is where $NH_4Cl$ is ammonium chloride, $NaNO_2$ is sodium nitrite, $N_2$ is nitrogen gas, NaCl is sodium chloride, and $H_2O$ is water, and the ammonium chloride and sodium nitrite are reacted in the presence of heat and hydrogen ions.

A nineteenth aspect combinable with any of the previous aspects further includes generating a pressure pulse with the nitrogen gas to fracture the formation.

In a twentieth aspect combinable with any of the previous aspects, the ammonium chloride includes 2.5-10 Molar of ammonium chloride, and the sodium nitrite includes 2.5-10 Molar of sodium nitrite.

In a twenty-first aspect combinable with any of the previous aspects, the nitrogen gas includes nitrogen gas at between 988 pounds per square inch (psi) and 16,600 psi at 50% volume.

In a twenty-second aspect combinable with any of the previous aspects, the exothermic chemical reaction includes an initiation pH level, the method further including adjusting a pH at the location in the wellbore to the initiation pH level subsequent to providing the amount of the chemical material to the location in the wellbore.

In a twenty-third aspect combinable with any of the previous aspects, adjusting the pH at the location in the wellbore to the initiation pH level subsequent to providing the amount of the chemical material to the location in the wellbore includes reducing the pH at the location in the wellbore to the initiation pH level.

In a twenty-fourth aspect combinable with any of the previous aspects, adjusting the pH at the location in the wellbore to the initiation pH level subsequent to providing the amount of the chemical material to the location in the wellbore includes injecting an acid into the wellbore to the location of the wellbore.

In another general implementation, a well testing system includes a delivery system in fluid communication with a location in a wellbore that is adjacent a hydrocarbon-bearing formation of a subterranean zone; and a control system communicably coupled to the delivery system and operable to control the delivery system to provide an amount of a chemical material to the location in the wellbore, wherein the chemical material is reactable to generate an exothermic chemical reaction at the location in the wellbore to fracture the formation by the exothermic chemical reaction.

In a first aspect combinable with the general implementation, the exothermic chemical reaction generates a pressure pulse to fracture the formation.

In a second aspect combinable with any of the previous aspects, the chemical material includes an ammonium material and a nitrite material.

In a third aspect combinable with any of the previous aspects, the ammonium material includes at least one of ammonium chloride, ammonium bromide, ammonium nitrate, ammonium sulfate, ammonium carbonate, or ammonium hydroxide.

In a fourth aspect combinable with any of the previous aspects, the nitrite material includes at least one of sodium nitrite, potassium nitrite, or sodium hypochlorite.

In a fifth aspect combinable with any of the previous aspects, the chemical material includes a combination of urea and sodium hypochlorite, urea and sodium nitrite, ammonium hydroxide and sodium hypochlorite, or ammonium chloride and sodium nitrite.

A sixth aspect combinable with any of the previous aspects further includes a production system to produce a hydrocarbon fluid from the formation through the fractures and to the wellbore, and wherein the control system is operable to determine at least one well parameter based on the produced hydrocarbon fluid.

In a seventh aspect combinable with any of the previous aspects, the well parameter includes at least one of well head pressure, well head temperature, sand presence, oil gravity, gas gravity, or water salinity.

In an eighth aspect combinable with any of the previous aspects, the pressure pulse includes a pressure magnitude that is greater than a breakdown pressure of the formation.

In a ninth aspect combinable with any of the previous aspects, the control system is operable to determine at least one of a volume percentage of the chemical material or a concentration of the chemical material based on the breakdown pressure of the formation.

In a tenth aspect combinable with any of the previous aspects, the control system is operable to control the delivery system to provide a cooling fluid into the wellbore, the cooling fluid having a temperature less than an initiation temperature of the exothermic chemical reaction.

In an eleventh aspect combinable with any of the previous aspects, the cooling fluid includes brine.

In a twelfth aspect combinable with any of the previous aspects, the control system is operable to control the delivery system to provide a cooling fluid into the wellbore until a temperature at the location in the wellbore is less than a specified temperature at the location.

In a thirteenth aspect combinable with any of the previous aspects, the chemical material reacts to generate the exothermic chemical reaction at the location in the wellbore when a temperature at the location raises to the initiation temperature of the exothermic chemical reaction.

In a fourteenth aspect combinable with any of the previous aspects, the chemical material includes a reducer and an oxidizer.

In a fifteenth aspect combinable with any of the previous aspects, the reducer and the oxidizer combine with heat to generate the exothermic chemical reaction.

In a sixteenth aspect combinable with any of the previous aspects, the control system is operable to control the delivery system to provide the reducer and the oxidizer separately into the wellbore.

In a seventeenth aspect combinable with any of the previous aspects, the exothermic chemical reaction is where $NH_4Cl$ is ammonium chloride, $NaNO_2$ is sodium nitrite, $N_2$ is nitrogen gas, NaCl is sodium chloride, and $H_2O$ is water, and the ammonium chloride and sodium nitrite are reacted in the presence of heat and hydrogen ions.

In an eighteenth aspect combinable with any of the previous aspects, the nitrogen gas generates a pressure pulse to fracture the formation.

In a nineteenth aspect combinable with any of the previous aspects, the ammonium chloride includes 2.5-10 Molar of ammonium chloride, and the sodium nitrite includes 2.5-10 Molar of sodium nitrite.

In a twentieth aspect combinable with any of the previous aspects, the nitrogen gas includes nitrogen gas at between 988 pounds per square inch (psi) and 16,600 psi at 50% volume.

In a twenty-first aspect combinable with any of the previous aspects, the exothermic chemical reaction includes an initiation pH level, and the control system is further operable to control the delivery system to provide a pH reducer to the location in the wellbore to reduce a pH of the chemical material to the initiation pH level.

In a twenty-second aspect combinable with any of the previous aspects, the pH reducer includes an acid.

Implementations of methods and systems for well testing according to the present disclosure may include one or more of the following features. For example, unconventional or tight reservoirs may be more quickly tested as compared to drawdown and build-up testing methods, as testing can proceed without the build-up process that may take a significant amount of time (for example, weeks or months). Also, in unconventional or tight reservoirs that do not exhibit hydrocarbon flow, the disclosed methods and systems may generate a flow without requiring a complete or full hydraulic fracturing operation. As another example, the disclosed methods and systems may provide well testing information so that further decisions (for example, hydraulic fracturing) about well completion may be better determined. As yet another example, the disclosed methods and systems may allow for appraisal wells to be drilled and provide well information without further intervention or completion procedures to be undertaken, often at large cost.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
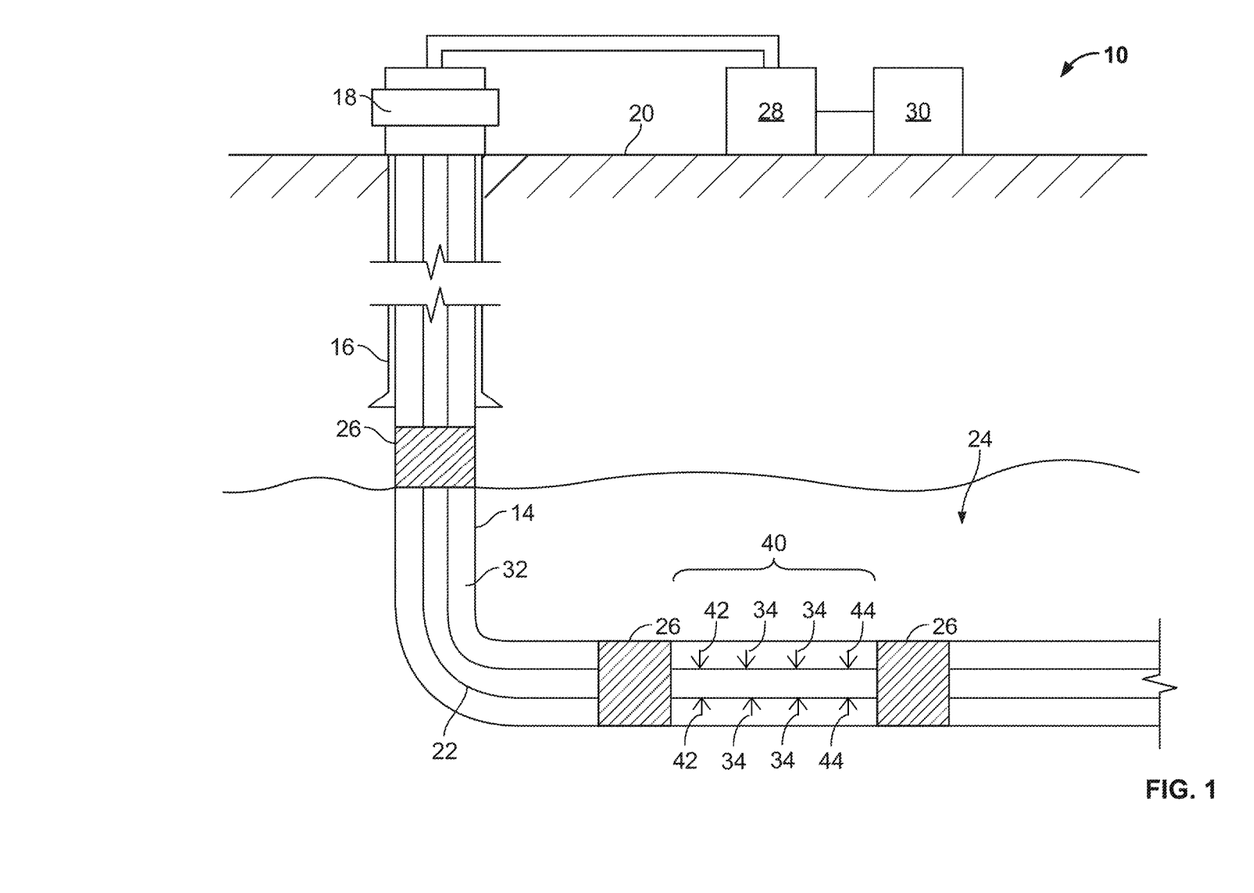
FIGS. 1-2 are schematic diagrams of a well system for testing a well by generating a downhole chemical reaction.
Figure 2:
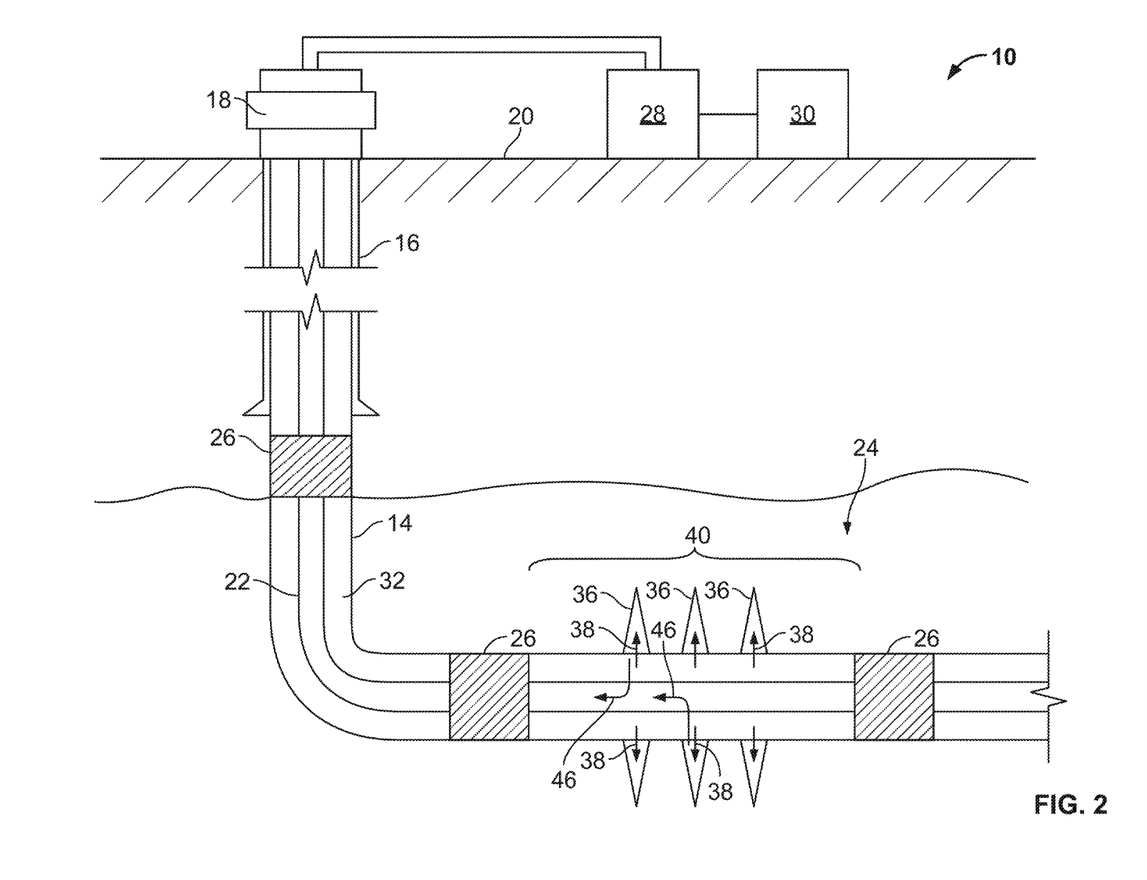

FIGS. 1-2 are schematic diagrams of a well system 10 for testing a well by generating a downhole chemical reaction.

In some implementations, a downhole chemical reaction may be initiated by providing a chemical material (for example, two or more chemical components) to a particular location in a wellbore that is adjacent a productive geological formation. The chemical reaction may be exothermic and release, for example, heat and pressurized gas. The pressurized gas, released as a pressure pulse, may cause the formation to fracture. Hydrocarbon fluid (for example, oil or gas or both) may be produced from the fractured formation. In this example, FIG. 1 illustrates the well system 10 prior to initiation of the chemical reaction, while FIG. 2 illustrates the well system 10 subsequent to the completion of the chemical reaction.

The example well system 10 includes a wellbore 14 formed (for example, drilled) from a terranean surface 20 to a subterranean zone 24. In this example, the wellbore 14 is an open hole completion configuration with a surface casing 16. Also, although shown as a deviated wellbore 14 with a vertical, radiussed, and horizontal portion, the wellbore 14 may be a vertical wellbore, lateral wellbore, or other type of directional wellbore. As shown, a type of production tubing, referred to as casing 16, is cemented (or otherwise positioned) in the wellbore 14 and coupled to a wellhead 18 at the surface 20. The casing 16 extends only through the vertical portion of the wellbore 14. The remainder of the wellbore 14 is completed open hole (for example, without casing). In some alternative implementations, however, one or more casings may be positioned in the wellbore 14 without departing from the scope of this disclosure.

A production tubing string 22 extends from wellhead 18, through the wellbore 14 and into the subterranean zone 24. The tubing string 22 can take many forms, for example, as a continuous tubing string 22 between the subterranean zone 24 and the wellhead 18, as a length of production liner coupled to the casing 16 at a liner hanger with a tieback liner extending from the liner hanger to the wellhead 18, or another configuration. A production packer 26 seals the annulus 32 between the tubing string 22 and the casing 16. Additional packers 26 can be provided along the tubing string 22 to seal the annulus 32 between the wellbore wall and the tubing string 22. The tubing string 22 operates in delivering fluids (for example, chemicals for the chemical material to generate the reaction) and producing fluids (for example, oil, gas, and other fluids) between the subterranean zone 24 and the surface 20.

Well system 10, in this implementation, includes a delivery system 28 (shown schematically) and a control system 30 (also shown schematically). The delivery system 28 is fluidly coupled to the tubing string 22 and includes, for example, one or more pumps, one or more valves, one or more tanks or other fluid storage equipment, and other necessary hydraulic delivery equipment to deliver (for example, circulate) one or more fluids from the terranean surface 20 to the subterranean zone 24 through the tubing string 22, the annulus 32, or both. Furthermore, the delivery system 28 can produce (for example, circulate) one or more fluids from the subterranean zone 24 to the terranean surface 20 through the tubing string 22, the annulus 32, or both.

The control system 30 is communicably coupled (for example, wirelessly or with wires) to the delivery system 28 to control operation of the components of the delivery system 28. For example, the control system 30 may be coupled to pump motors, valve actuators, and other delivery equipment to operate such equipment. For instance, the control system 30 may, based on commands from an operator or predetermined control scheme (for example, encoded in instructions on a computer-readable media), turn on, turn off, and modulate one or more pumps. The control system 30 may, based on commands from an operator or predetermined control scheme, open, close, and modulate one or more valves.

In example implementations, the control system 30 may be mechanically, electrically, electro-mechanically, hydraulically, or pneumatically operated. In other example implementations, the control system 30 may be an electronic, microprocessor-based control system.

In some implementations, subterranean zone 24 represents an unconventional, or tight, reservoir, such as tight sand or shale. Unconventional reservoirs may exhibit a flow of hydrocarbon fluid during drilling, but do not exhibit a flow of hydrocarbon fluid (for example, from the rock to the wellbore 14) during well testing. Thus, in order for the wellbore 14 to be conventionally tested (for production) in the unconventional reservoir, the well system 10 is shut-in for a period of time (for example, weeks, months, or longer). During shut-in, wellbore pressure may escalate to eventually drive a flow of hydrocarbon production through the wellbore 14 and to the surface 20 in order to test, or appraise, the well. Alternatively, the well system may be conventionally tested by hydraulically fracturing the subterranean zone 24. Hydraulic fracturing operations, however, are costly and time consuming as well. Only after a shut-in or hydraulic fracturing operation can many wells formed in unconventional reservoirs be conventionally tested.

Figure 3:
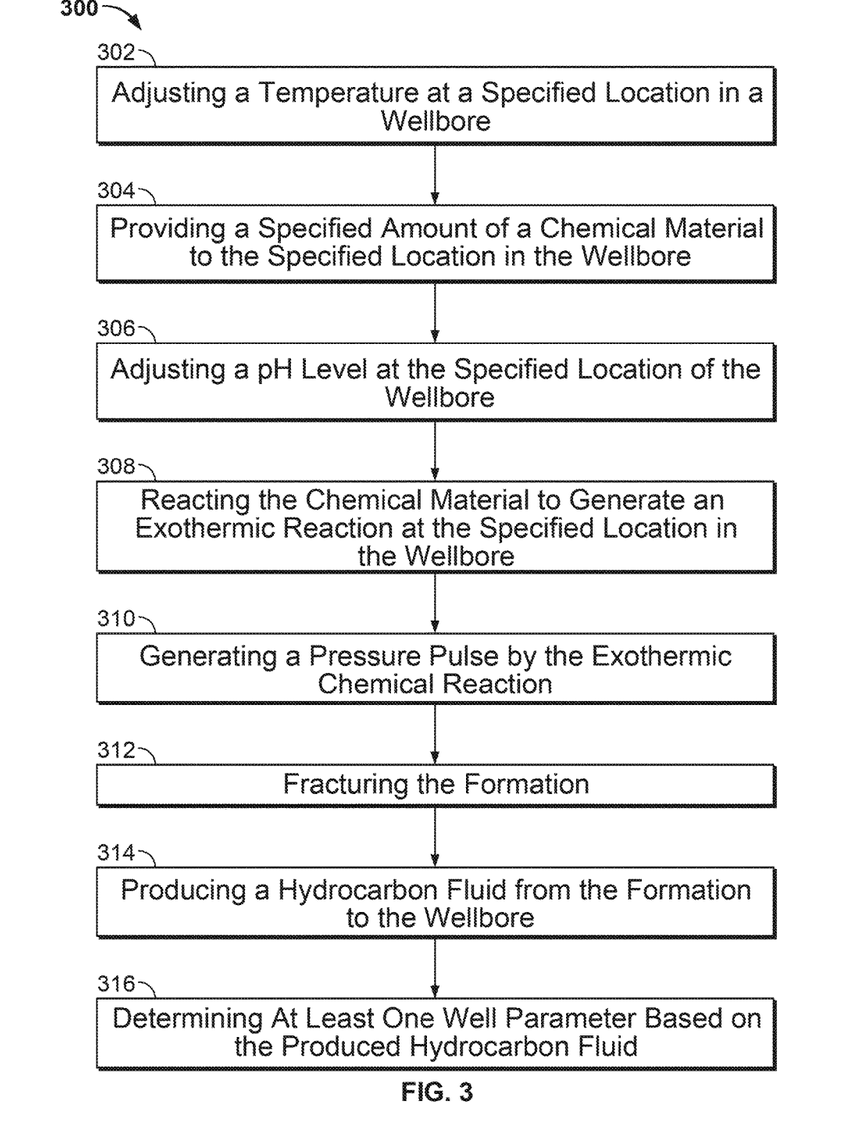
FIG. 3 is a flowchart that illustrates an example method for testing a well by generating a downhole chemical reaction.

FIG. 3 is a flowchart that illustrates an example method 300 for testing a well by generating a downhole chemical reaction. In some implementations, method 300 may be performed by or with the well system 10 shown in FIGS. 1-2. With reference to FIGS. 1-3, method 300 may begin at step 302, which includes adjusting a temperature at a location in a wellbore. For instance, in well system 10, a location 40 of the wellbore 14 may be between two packers 26, which create a fluidly isolated section of the annulus 32. The location of the wellbore 14 may be open to the formation 24 or cased (and likely perforated).

In this example implementation, adjusting the temperature of the wellbore 14 may include cooling the wellbore 14 (and annulus 32) at the location 40 so that a subsequent chemical reaction does not initiate too soon or prior to desired. For example, in some aspects, the chemical reaction may have a particular initiation temperature based on, for example, the particular combination of chemical components that generate the chemical reaction. Should the initiation temperature be less than the wellbore temperature at the location 40, the wellbore 14 may be cooled to a temperature less than the initiation temperature.

In some implementations, the temperature of the wellbore 14 (and annulus 32) is cooled by delivery (for example, pumping) of a cooling fluid (jets 42) by the delivery system 28, through the tubing string 22, and to the location 40 of the wellbore 14. In an example aspect, the cooling fluid 42 is brine or other aqueous liquid, such as formation or produced water from the subterranean zone 24 (or other subterranean location). Once the wellbore 14 is less than the specified temperature (or at another desired temperature), delivery of the cooling fluid 42 may stop.

Method 300 may continue at step 304, which includes providing an amount of a chemical material to the location in the wellbore. For example, as shown in FIG. 1, a chemical material (arrows 34) is circulated by the delivery system 28, through the tubing string 22, to the location 40. In some aspects, the chemical material 34 may be a combination of two or more chemicals (for example, liquids, semi-solids, solids, gels, gasses, or combinations thereof) that are mixed together at the terranean surface 20, in the tubular string 22, or in the annulus 32. Thus, the chemical material 34 may be provided to the location 40 in its separate constituents or as a mixture.

The chemical material 34, in some aspects, combines a reducer and an oxidizer. An example reducer is an ammonium compound such as, for example, ammonium chloride, ammonium bromide, ammonium nitrate, ammonium sulfate, ammonium carbonate, and ammonium hydroxide. An example oxidizer is a nitrite compound such as, for example, sodium nitrite, potassium nitrite, sodium hypochlorite. In a specific example of the chemical material 34, ammonium chloride and sodium nitrite are combined to form the chemical material 34 (discussed in more detail with reference to step 308 and FIGS. 4-6). Other examples include urea and sodium hypochlorite, urea and sodium nitrite, ammonium hydroxide and sodium hypochlorite.

Method 300 may continue at step 306, which includes adjusting a pH level at the location of the wellbore. For example, in some aspects, the chemical mixture 34 may have a specified pH initiation level. Thus, the chemical mixture 34 may remain in the wellbore 14 without generating a chemical reaction until the wellbore pH level at the location 40 reaches the pH initiation level. In some aspects, adjusting the pH level includes delivering (for example, with the delivery system 28) a pH reducer 44 (for example, a liquid) into the wellbore 14 through the tubing string 22. The pH reducer 44 can be an acid.

Method 300 may continue at step 308, which includes reacting the chemical material to generate an exothermic reaction at the location in the wellbore. For example, when the chemical material 34 reaches its initiation temperature or reaches its initiation pH level, or both, the chemical material 34 reacts to form the exothermic chemical reaction. In some aspects, the chemical temperature 34 may reach its initiation temperature in a period after being delivered to the location 40 without step 302 being completed. For instance, cooling to adjust the temperature of the wellbore 14 at the location 40 may not be necessary, and the chemical material 34 may react after heating up to the initiation temperature due to a higher wellbore temperature than initial chemical material temperature. Further, the chemical material 34 may be at the pH initiation level when delivered to the location, thus negating the need to complete step 306.

In any event, once all reaction conditions (for example, temperature and pH) have been met, the chemical material 34 reacts to generate the exothermic reaction, which outputs pressurized gas and heat at the location 40 in the wellbore 14. In a specific example, ammonium chloride and sodium nitrite are reacted according to the following reaction:

Eq. 1

$$NH_4Cl + NaNO_2 \xrightarrow{(H^+, \Delta T)} N_2 + NaCl + 2H_2O + Heat$$

where $NH_4Cl$ is the ammonium chloride, $NaNO_2$ is the sodium nitrite, $N_2$ is nitrogen gas, NaCl is sodium chloride, and $H_2O$ is water. According to Eq. 1, the ammonium chloride and sodium nitrite are reacted in the presence of heat (in the wellbore 14), hydrogen ions, or both. In this example, three molar of each reactant (ammonium chloride and sodium nitrite) results, from this reaction, in 400 standard cubic feet (scf) of nitrogen gas and 137,000 British thermal units (btu) are generated per barrel of chemical material 34. In some aspects, heat (for example, above a particular initiation temperature) may be all that is necessary to react the ammonium chloride and sodium nitrite. In some aspects, hydrogen ions from an acid (for example, acetic acid) may be all that is necessary to react the ammonium chloride and sodium nitrite.

Method 300 may continue at step 310, which includes generating a pressure pulse by the exothermic chemical reaction. For example, a pressure pulse (arrows 38) is generated from the output of the pressurized gas, such as the nitrogen gas produced according to Eq. 1. In some aspects, the magnitude of the pressure pulse is specified based, at least in part, on a breakdown pressure of the formation in the subterranean zone 24. The breakdown, or fracture, pressure is, generally, a sum of an in-situ stress of the formation and a tensile strength of the formation, and represents the pressure at which the formation fractures and allows hydrocarbon fluid to flow from the formation.

Method 300 may continue at step 312, which includes fracturing the formation with the pressure pulse. For example, as shown in FIG. 2, the subterranean zone 24 forms fractures 36 based on the pressure pulse 38 (for example, the pressurized nitrogen gas). Each fracture 36 may represent a crack or fissure in the formation of the subterranean zone 24 through which hydrocarbon fluid may flow into the annulus 32.

Method 300 may continue at step 314, which includes producing a hydrocarbon fluid from the formation to the wellbore. As shown in FIG. 2, for example, hydrocarbon fluid 46 may flow into the wellbore 14 and into the tubing string 22 (as shown, or annulus 32) from the subterranean zone 24, through the formed fractures 36. In some aspects, the delivery system 28 (or other production system) may produce the hydrocarbon fluid 46 to the terranean surface 20 for analysis.

Method 300 may continue at step 316, which includes determining at least one well parameter based on the produced hydrocarbon fluid. For example, as the hydrocarbon fluid 46 is produced to the terranean surface 20, the fluid 46 may be analyzed to determine one or more properties, such as well productivity, permeability, pressure, formation damage (skin), drainage area, well head pressure and temperature, separator conditions, sand presence, and preliminary characterization of fluids (for example, oil gravity, gas gravity, and water salinity). In some aspects, by determining one or more of such parameters, further decisions may be made by a well operator. Such decisions include, whether to perform a mini- or full hydraulic fracturing operation, whether to drill further test or appraisal wells, or whether to abandon the field, as some examples.

Figure 4:
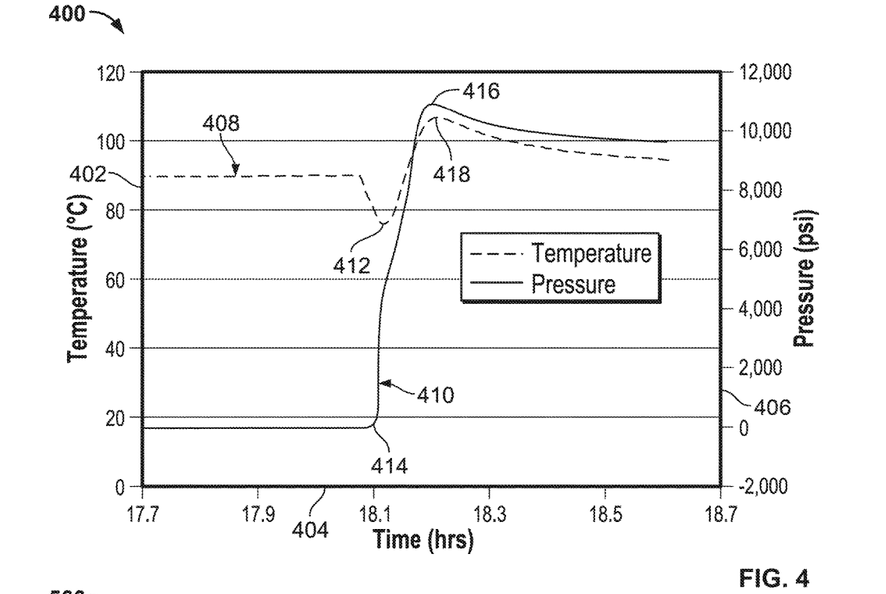
FIG. 4 is a graphical illustration of a relationship between temperature and time during well testing through a downhole chemical reaction.

FIG. 4 is a graphical illustration 400 of a relationship between pressure/temperature and time during well testing through a downhole chemical reaction. More specifically, graph 400 shows how wellbore pressure and wellbore temperature at a particular location in a wellbore change during a well test that includes a downhole chemical reaction, such as that described with reference to FIGS. 1-3. Graph 400, as shown, includes a first y-axis 402 of wellbore temperature in degrees Celsius (° C.), a second y-axis 406 of wellbore pressure delta in pounds per square inch (psi), and an x-axis 404 of time in hours (hrs). The wellbore pressure delta represents the wellbore pressure difference between the wellbore pressure at the particular location prior to the downhole chemical reaction and the wellbore pressure subsequent to the downhole chemical reaction.

As illustrated, a temperature plot 408 represents wellbore temperature, which holds steady at about 90° C. until prior to point 412. Prior to point 412, where the temperature starts to drop from about 90° C., a chemical material is injected to the particular location in the wellbore. The wellbore temperature drops from the point of injection (prior to point 412) to point 412 on plot 408 as the chemical material adsorbs energy (for example, heat) in the wellbore. The chemical material, in this example, is a mixture of ammonium chloride and sodium nitrite, the reaction of which is governed by Eq. 1. A pressure plot 410 represents wellbore pressure delta, which holds steady at about 0 psi (that is, no significant change to current wellbore pressure, which is greater than 0 psi) until prior to point 414, which represents the initiation of the chemical reaction.

At point 412, the chemical material reacts to generate an exothermic chemical reaction as governed by Eq. 1. As the plot 410 moves vertical subsequent to point 414, the temperature plot 408 is still descending to point 412, before temperature then starts to increase. In this period, the exothermic chemical reaction may be in "runaway" and is providing energy to itself before reaction heat is transferred to increase the wellbore temperature. This vertical portion of plot 410, in some aspects, represents an elevating wellbore pressure against geologic formation prior to reaching a breakdown, or fracture, pressure of the formation.

As further illustrated, plot 410 begins to deviate from vertical between 3,000 and 3,500 psi (estimated from graph 400). In some aspects, this deviation from vertical represents a pressure at which the pressure generated by the exothermic chemical reaction exceeds the breakdown, or fracture, pressure of the formation. Heat from the exothermic chemical reaction also causes the temperature of the wellbore to rise, starting at 412.

As shown in FIG. 4, the temperature plot 408 spikes to a peak 418 of about 110° C. within about 0.1 hrs. The pressure plot 410 also spikes to a peak 416 of about 11,000 psi within about 0.1 hrs. Thus, as shown, the exothermic chemical reaction quickly generates heat and increased pressure in the wellbore. The wellbore pressure, especially, increases orders of magnitude and is sufficient to generate a pressure pulse as described previously.

Figure 5:
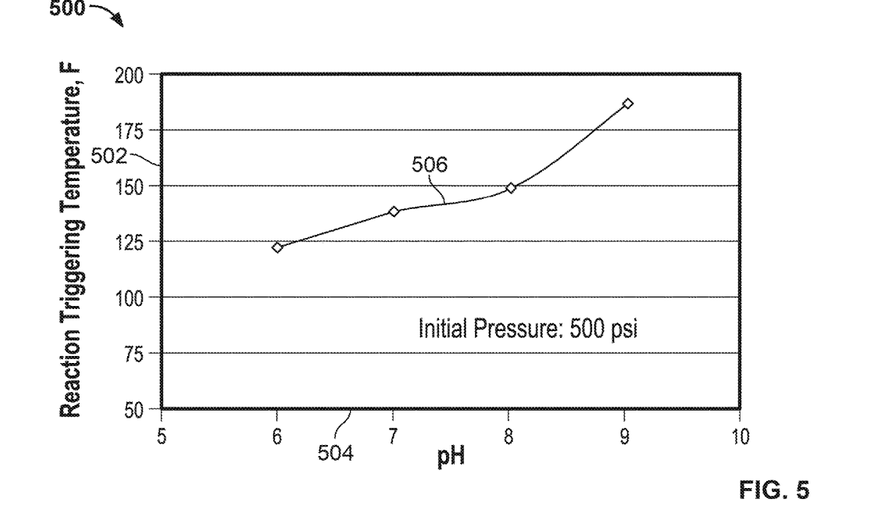
FIG. 5 is a graphical illustration of a relationship between temperature and pH during well testing through a downhole chemical reaction.

FIG. 5 is a graphical illustration 500 of a relationship between temperature and pH during well testing through a downhole chemical reaction. More specifically, graph 500 shows how a change of pH at a particular location in a wellbore can trigger a chemical material to react, such as that described with reference to FIGS. 1-3 (and step 306). Graph 500, as shown, includes a y-axis 502 of reaction trigger temperature in degrees Fahrenheit (° F.) and an x-axis 504 of pH at the particular location in the wellbore. The chemical material, in this example, is a mixture of ammonium chloride and sodium nitrite, the reaction of which is governed by Eq. 1 held under pressure of 500 psi. As illustrated, a plot 506 represents a relationship between the reaction trigger temperature (that is, the wellbore temperature in which the chemical material will generate the exothermic chemical reaction) based on the pH level of the chemical material in the wellbore. Thus, as shown, in this example, a chemical material with pH above 9 may not react at all. Within a pH level less than 10, however, the chemical material reacts at an initiation temperature of about 188° F. (at 9 pH) as estimated on the graph 500. Therefore, in step 306 of method 300, adjusting a pH level at the location may include, with reference to the example of FIG. 5, decreasing the pH from above 9 to no more than 9 in order to initiate the chemical reaction in step 308.

Figure 6:
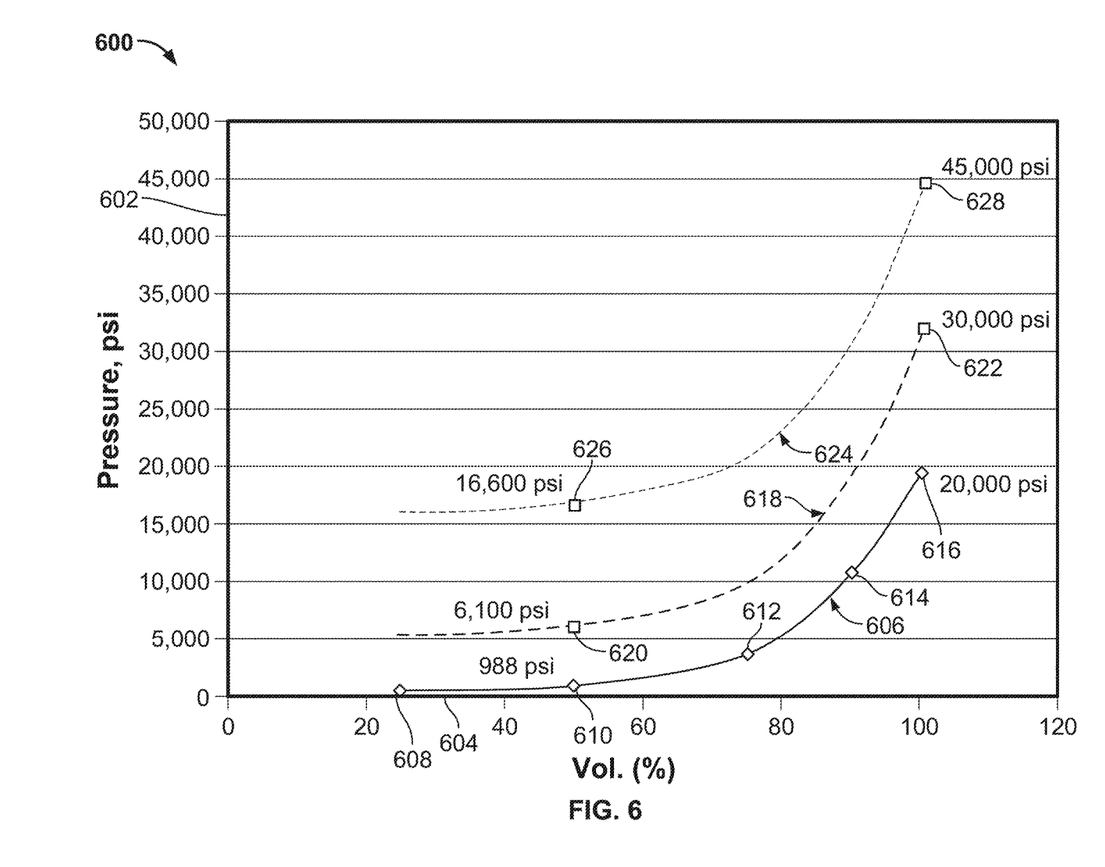
FIG. 6 is a graphical illustration of a relationship between pressure and volume and concentration of a chemical material used during well testing through a downhole chemical reaction.

FIG. 6 is a graphical illustration 600 of a relationship between pressure and volume and concentration of a chemical material used during well testing through a downhole chemical reaction. For example, as discussed previously, a concentration (for example, molar concentrations) of a chemical material, as well as a volume of the chemical material (for example, number of barrels of the chemical material delivered into the wellbore) can affect a magnitude of a pressure pulse generated by an exothermic chemical reaction of the chemical material. Graph 600, as shown, includes a y-axis 602 of magnitude of a generated pressure pulse in psi and an x-axis 604 of volume of chemical material in percentage (%). The volume percentage in this example represents a ratio of a volume of reactant solution (that is, the chemical material) to a total volume of the reactor (that is, the volume in which the chemical material is reacted). In this example, the chemical material is a mixture of ammonium chloride and sodium nitrite, the reaction of which is governed by Eq. 1.

Graph 600 includes several plots that represent the ammonium chloride and sodium nitrite mixture at different molar concentrations. Plot 606 represents a 2.5 molar concentration of the chemical material within a range of volume percentages between about 25% and 100%. Plot 618 represents a 7 molar concentration of the chemical material within a range of volume percentages between about 25% and 100%. Plot 624 represents a 10 molar concentration of the chemical material within a range of volume percentages between about 25% and 100%.

As shown in FIG. 6, a magnitude of a generated pressure pulse increases with both an increase in volume percentage of the chemical material as well as molar concentration of the chemical material. In this graph 600, the volume percentage represents a volume of solution containing reactant chemicals (for example, ammonium chloride and sodium nitrite) compared to a total volume of the reactant vessel (for example, the total volume of the wellbore into which the reactant chemicals are distributed).

With respect to an increase in pressure pulse magnitude due to volume percentage increase, points 608, 610, 612, 614, and 616 are located on plot 606 and represent, respectively, volume percentages of about 25%, 50%, 75%, 90%, and 100%. As shown, each successive point 608 through 616 represents an increasing pressure pulse magnitude, from about less than 1,000 psi at point 608 to about 20,000 psi at point 616 (estimated from graph 600).

With respect to an increase in pressure pulse magnitude due to molar concentration increase, points 610, 620, and 626 are located on plots 606, 618, and 624, respectively and represent different molar concentrations of the chemical material at an identical volume percentage of about 50%. As shown, at the identical volume percentage, each successive point 610, 620, and 626 represents an increasing pressure pulse magnitude, from 988 psi at point 610 to 16,600 psi at point 626.

Figure 7:
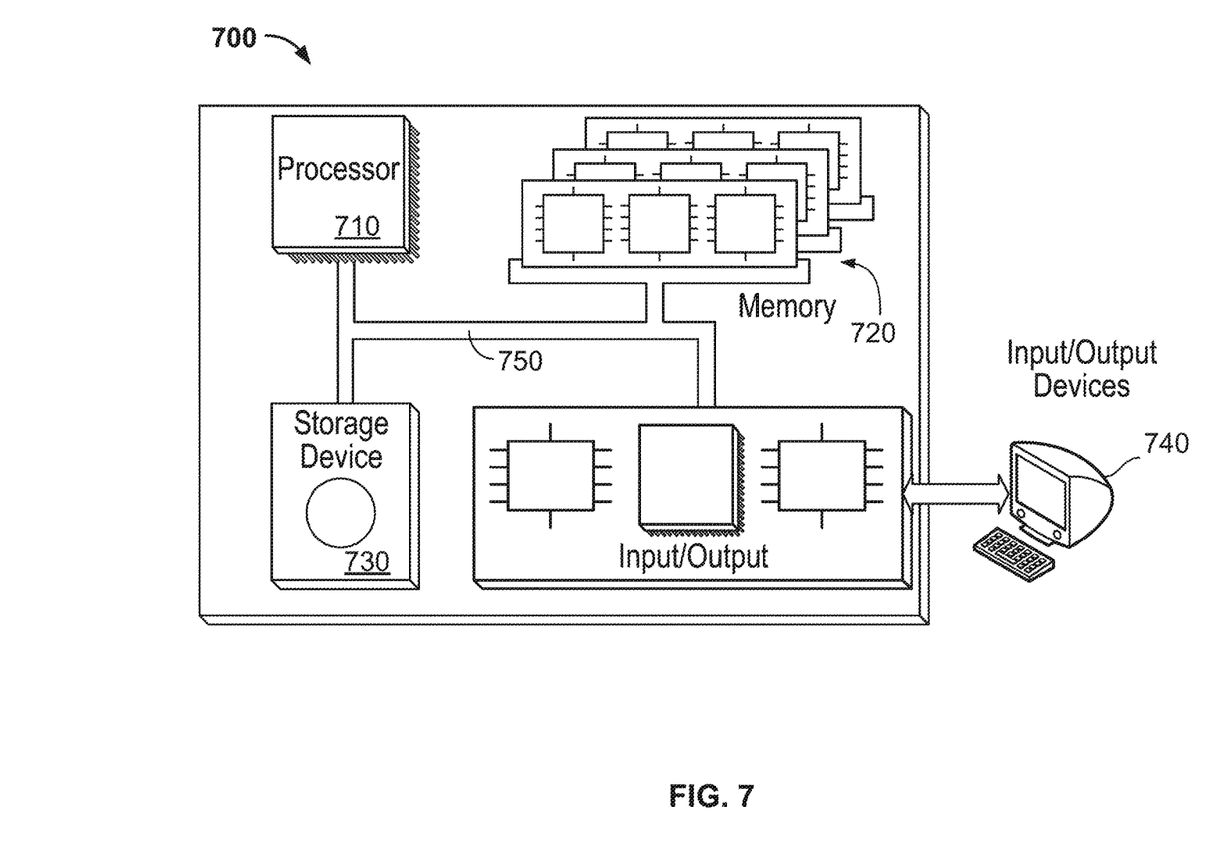
FIG. 7 is a schematic illustration of an example controller of a well system for testing a well by generating a downhole chemical reaction.

FIG. 7 is a schematic illustration of an example controller 700 of a testing apparatus for determining one or more rock mechanical properties. For example, the controller 700 can be used for the operations described previously, for example as or as part of the control system 30 or other controllers described in this disclosure. For example, the controller 700 may be communicably coupled with, or as a part of, one or both of a vehicle engine and on-board fuel separation system as described in this disclosure.

The controller 700 is intended to include various forms of digital computers, such as printed circuit boards (PCB), processors, or digital circuitry, that is part of a vehicle. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 700 includes a processor 710, a memory 720, a storage device 730, and an input/output device 740. Each of the components 710, 720, 730, and 740 are interconnected using a system bus 750. The processor 710 is capable of processing instructions for execution within the controller 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the controller 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the controller 700. In one implementation, the storage device 730 is a computer-readable medium. In various different implementations, the storage device 730 may be a floppy disk device, a hard disk device, an optical disk device, or a tape device.

The input/output device 740 provides input/output operations for the controller 700. In one implementation, the input/output device 740 includes a keyboard or pointing device or both. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described previously as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described previously should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described in this disclosure may include more steps or fewer steps than those described. Further, the steps in such example operations, methods, or processes may be performed in different successions than that described or illustrated in the figures. Accordingly, other implementations are within the scope of the following claims.

What is claimed is:

1. A well testing method, comprising:
   providing an amount of a chemical material to a location in a wellbore;
   prior to providing the amount of the chemical material to the location in the wellbore, cooling the location in the wellbore to a temperature at the location in the wellbore that is less than an initiation temperature of an exothermic chemical reaction generated by the chemical material;
   based on the temperature of the wellbore at the location rising to at least the initiation temperature, reacting the chemical material to generate the exothermic chemical reaction at the location in the wellbore; and
   fracturing the formation by the exothermic chemical reaction.

2. The well testing method of claim 1, wherein the chemical material comprises an ammonium material and a nitrite material.

3. The well testing method of claim 2, wherein the ammonium material comprises at least one of ammonium chloride, ammonium bromide, ammonium nitrate, ammonium sulfate, ammonium carbonate, or ammonium hydroxide, and the nitrite material comprises at least one of sodium nitrite, potassium nitrite, or sodium hypochlorite.

4. The well testing method of clam 1, wherein the chemical material comprises a combination of urea and sodium hypochlorite, urea and sodium nitrite, ammonium hydroxide and sodium hypochlorite, or ammonium chloride and sodium nitrite.

5. The well testing method of claim 1, further comprising:
   producing a hydrocarbon fluid from the formation to the wellbore; and
   determining at least one well parameter based on the produced hydrocarbon fluid, the well parameter comprising at least one of well head pressure, well head temperature, sand presence, oil gravity, gas gravity, or water salinity.

6. The well testing method of claim 1, further comprising:
   generating a pressure pulse, by the exothermic chemical reaction, to fracture the formation.

7. The well testing method of claim 6, wherein the pressure pulse comprises a pressure magnitude that is greater than a breakdown pressure of the formation, the method further comprising determining at least one of a volume percentage of the chemical material or a concentration of the chemical material based on the breakdown pressure of the formation.

8. The well testing method of claim 1, wherein cooling the location in the wellbore comprises circulating a cooling fluid into the wellbore until the temperature at the location in the wellbore is less than the specified temperature at the location, the cooling fluid having a temperature less than the initiation temperature of the exothermic chemical reaction.

9. The well testing method of 8, wherein reacting the chemical material to generate the exothermic chemical reaction at the location in the wellbore comprises reacting the chemical material to generate the exothermic chemical reaction at the location in the wellbore when the temperature at the location raises to the initiation temperature of the exothermic chemical reaction.

10. The well testing method of claim 1, wherein the chemical material comprises a reducer and an oxidizer, and reacting the chemical material to generate an exothermic chemical reaction at the location in the wellbore comprises reacting the reducer and the oxidizer with heat to generate the exothermic chemical reaction.

11. The well testing method of claim 10, further comprising mixing the reducer and the oxidizer together in the wellbore.

12. The well testing method of claim 1, wherein the exothermic chemical reaction comprises an initiation pH level, the method further comprising adjusting a pH at the location in the wellbore to the initiation pH level subsequent to providing the amount of the chemical material to the location in the wellbore.

13. The well testing method of claim 12, wherein adjusting the pH at the location in the wellbore to the initiation pH level subsequent to providing the amount of the chemical material to the location in the wellbore comprises at least one of: reducing the pH at the location in the wellbore to the initiation pH level, or injecting an acid into the wellbore to the location of the wellbore.

14. The well testing method of claim 1, wherein the exothermic chemical reaction comprises:

$$NH_4Cl + NaNO_2 \xrightarrow{(H^+, \Delta T)} N_2 + NaCl + 2H_2O + Heat,$$

where $NH_4Cl$ is ammonium chloride, $NaNO_2$ is sodium nitrite, $N_2$ is nitrogen gas, $NaCl$ is sodium chloride, and $H_2O$ is water, and the ammonium chloride and sodium nitrite are reacted in the presence of heat and hydrogen ions.

15. The well testing method of claim 14, further comprising generating a pressure pulse with the nitrogen gas to fracture the formation.

16. The well testing method of claim 14, wherein the ammonium chloride comprises 2.5-10 Molar of ammonium chloride, and the sodium nitrite comprises 2.5-10 Molar of sodium nitrite, and the nitrogen gas comprises nitrogen gas at between 988 pounds per square inch (psi) and 16,600 psi at 50% volume.

17. A well testing system, comprising:
a delivery system in fluid communication with a location in a wellbore that is adjacent a hydrocarbon-bearing formation of a subterranean zone; and
a control system communicably coupled to the delivery system and operable to control the delivery system to:
provide an amount of a chemical material to the location in the wellbore, wherein the chemical material is reactable to generate an exothermic chemical reaction at the location in the wellbore to fracture the formation by the exothermic chemical reaction; and
prior to providing the amount of the chemical material to the location in the wellbore, provide a cooling medium to the location in the wellbore so that a temperature at the location in the wellbore is less than an initiation temperature of the exothermic chemical reaction generated by the chemical material, wherein the chemical material reacts to generate the exothermic chemical reaction at the location in the wellbore when the temperature at the location raises to the initiation temperature of the exothermic chemical reaction.

18. The well testing system of claim 17, wherein the exothermic chemical reaction generates a pressure pulse to fracture the formation.

19. The well testing system of claim 17, wherein the chemical material comprises an ammonium material and a nitrite material, and the ammonium material comprises at least one of ammonium chloride, ammonium bromide, ammonium nitrate, ammonium sulfate, ammonium carbonate, or ammonium hydroxide, and the nitrite material comprises at least one of sodium nitrite, potassium nitrite, or sodium hypochlorite.

20. The well testing system of claim 17, wherein the chemical material comprises a combination of urea and sodium hypochlorite, urea and sodium nitrite, ammonium hydroxide and sodium hypochlorite, or ammonium chloride and sodium nitrite.

21. The well testing system of claim 17, further comprising a production system to produce a hydrocarbon fluid from the formation through the fractures and to the wellbore, and wherein the control system is operable to determine at least one well parameter based on the produced hydrocarbon fluid, the at least one well parameter comprising at least one of well head pressure, well head temperature, sand presence, oil gravity, gas gravity, or water salinity.

22. The well testing system of claim 17, wherein the pressure pulse comprises a pressure magnitude that is greater than a breakdown pressure of the formation, and the control system is operable to determine at least one of a volume percentage of the chemical material or a concentration of the chemical material based on the breakdown pressure of the formation.

23. The well testing system of claim 17, wherein the cooling medium comprises a cooling fluid having a temperature less than the initiation temperature of the exothermic chemical reaction.

24. The well testing system of claim 17, wherein the chemical material comprises a reducer and an oxidizer, and the reducer and the oxidizer combine with heat to generate the exothermic chemical reaction.

25. The well testing system of claim 24, wherein the control system is operable to control the delivery system to provide the reducer and the oxidizer separately into the wellbore.

26. The well testing system of claim 17, wherein the exothermic chemical reaction comprises:

$$NH_4 + NaNO_2 \xrightarrow{(H^+, \Delta T)} N_2 + NaCl + 2H_2O + Heat,$$

where $NH_4$ is ammonium chloride, $NaNO_2$ is sodium nitrite, $N_2$ is nitrogen gas, $NaCl$ is sodium chloride, and $H_2O$ is water, and the ammonium chloride and sodium nitrite are reacted in the presence of heat and hydrogen ions.

27. The well testing system of claim 26, wherein the nitrogen gas generates a pressure pulse to fracture the formation.

28. The well testing system of claim 26, wherein the ammonium chloride comprises 2.5-10 Molar of ammonium chloride, and the sodium nitrite comprises 2.5-10 Molar of sodium nitrite, and the nitrogen gas comprises nitrogen gas at between 988 pounds per square inch (psi) and 16,600 psi at 50% volume.

29. The well testing system of claim 17, wherein the exothermic chemical reaction comprises an initiation pH level, and the control system is further operable to control the delivery system to provide a pH reducer to the location in the wellbore to reduce a pH of the chemical material to the initiation pH level.

30. The well testing system of claim 29, wherein the pH reducer comprises an acid.

* * * * *

UNITED STATES PATENT AND TRADEMARK OFFICE
CERTIFICATE OF CORRECTION

| | |
|---|---|
| PATENT NO. | : 10,030,492 B2 |
| APPLICATION NO. | : 15/177002 |
| DATED | : July 24, 2018 |
| INVENTOR(S) | : Ayman Raja Al-Nakhli, Hazim Hussein Abass and Mirajuddin Riazuddin Khan |

It is certified that error appears in the above-identified patent and that said Letters Patent is hereby corrected as shown below:

In the Claims

Column 14, Line 39, replace "clam" with -- claim --

Column 15, Line 1, after "of", insert -- claim --

Signed and Sealed this
Twenty-fifth Day of December, 2018

Andrei Iancu
*Director of the United States Patent and Trademark Office*